US012393466B2

(12) United States Patent
Shah et al.

(10) Patent No.: US 12,393,466 B2
(45) Date of Patent: Aug. 19, 2025

(54) LOCK-FREE DATA AGGREGATION ON DISTRIBUTED SYSTEMS

(71) Applicant: International Business Machines Corporation, Armonk, NY (US)

(72) Inventors: Parth Sanjaybhai Shah, Bangalore (IN); Ranjal Gautham Shenoy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 761 days.

(21) Appl. No.: 17/529,494

(22) Filed: Nov. 18, 2021

(65) Prior Publication Data

US 2023/0153160 A1     May 18, 2023

(51) Int. Cl.
*G06F 9/50* (2006.01)
*G06F 8/65* (2018.01)
*G06F 8/77* (2018.01)

(52) U.S. Cl.
CPC .............. *G06F 9/505* (2013.01); *G06F 8/65* (2013.01); *G06F 8/77* (2013.01); *G06F 9/5072* (2013.01)

(58) Field of Classification Search
CPC ... G06F 9/505; G06F 8/65; G06F 8/77; G06F 9/5072; G06F 9/52
See application file for complete search history.

(56) References Cited

U.S. PATENT DOCUMENTS

| 2005/0050106 | A1 | 3/2005 | Wenner et al. |
| 2018/0088947 | A1 | 3/2018 | Landheer |
| 2019/0294711 | A1 | 9/2019 | Castro et al. |
| 2020/0133732 | A1 | 4/2020 | Kondiles et al. |
| 2020/0310895 | A1 | 10/2020 | Dolby et al. |
| 2021/0105281 | A1* | 4/2021 | Shin ..................... G06F 16/2255 |

FOREIGN PATENT DOCUMENTS

| CN | 105045632 A | 11/2015 |
| CN | 112099977 A | 12/2020 |
| CN | 110134439 A | 9/2021 |

OTHER PUBLICATIONS

International Search Report; International Application No. PCT/CN2022/124455; International Filing Date:Oct. 10, 2022; Date of mailing: Dec. 16, 2022; 8 pages.

(Continued)

*Primary Examiner* — Sisley N Kim
(74) *Attorney, Agent, or Firm* — Cantor Colburn LLP; Teddi Maranzano

(57) ABSTRACT

Aspects of the invention include distributed systems and methods that provide data aggregation in a fast, lock-free manner. A non-limiting example computer-implemented method includes producing new data at a first producer node of a distributed system having two or more producer nodes, a consumer node, and a global view. The global view includes a hierarchical binary tree of cell addresses. Each producer node includes a local view of the global view. Responsive to producing the new data, the local view of the first producer node is updated with the new data and a local timestamp and, if the local timestamp is greater than a global timestamp, a pointer in a cell address of the global view is flipped to point to the new data.

20 Claims, 11 Drawing Sheets

(56) References Cited

OTHER PUBLICATIONS

Gulisano et al., "Efficient Data Streaming Multiway Aggregation Through Concurrent Algorithmic Designs and New Abstract Data Types." ACM Symposium on Parallelism in Algorithms and Architectures (SPAA). Jun. 15, 2016. 30 Pages.
Jesus et al., "A survey of distributed data aggregation algorithms." IEEE Communications Surveys & Tutorials 17.1 (2014): 381-404.
Kokologiannakis et al.,"Stateless model checking of the Linux kernel's hierarchical read-copy-update (tree RCU)." SPIN 2017: Proceedings of the 24th ACM SIGSOFT International SPIN Symposium on Model Checking of Software. Jul. 2017. pp. 172.
Solis et al., "The impact of timing in data aggregation for sensor networks." 2004 IEEE International Conference on Communications (IEEE Cat. No. 04CH37577). vol. 6. IEEE, 2004.

* cited by examiner

Timestamp Solves Lost Updates Problem

| $P_1$ (relatively slower node) | $P_2$ (relatively faster node) |
|---|---|
| $T_1$: produce data<br>$T_2$: random delay (= 1 tick)<br>$T_3$: write $P_1.L_0$ with timestamp $T_3$<br>$T_4$: read $P_2.L_0$<br>$T_5$: write $P_1.L_1$<br>$T_6$:<br>$T_7$:<br>$T_8$:<br>$T_9$:<br>$T_{10}$:<br>$T_{11}$: Tries to write $L_{11}$ (but discards as $L_{11}$ already has timestamp T5 while $P_1$ is writing with timestamp $T_3$)<br>… | $T_1$:<br>$T_2$: produce data<br>$T_3$: random delay (=2 ticks)<br>$T_4$:<br>$T_5$: write $P_2.L_0$ with timestamp $T_5$<br>$T_6$: read $P_1.L_0$<br>$T_7$: write $P_2.L_1$<br>$T_8$: write $L_{11}$ with timestamp T5. Succeeds.<br>$T_{10}$: read $L_{12}$<br>$T_{11}$: write $P_2.L_2$<br>$T_{12}$: write $L_2$<br>…<br>$T_{n+2}$: read $P_n$<br>$T_{n+3}$: update shared memory |

FIG. 7

Random Delay Mitigates Concurrent Updates

| $P_1$ | $P_2$ |
|---|---|
| T1: produce data | T1: produce data |
| T2: random delay (3-tick delay) | T2: random delay (4-tick delay) |
| T3: | T3: |
| T4: | T4: |
| T5: write P1.L0 with timestamp T5 | T5: |
| T6: read P2.L0 | T6: write P2.L0 with timestamp T6 |
| T7: write P1.L1 | T7: read P1.L0 |
| T8: write L11 succeeds | T8: write P2.L1 |
| T9: read L12 | T9: write L11 (succeeds as timestamp on L11 would be T5 which is less than P2 timestamp T6) |
| T10: write P1.L2 | T10: read L12 |
| T11: write L2 | T11: write P2.L2 |
| ... | T12: write L2 |
| | ... |

FIG. 8

LOCK-FREE DATA AGGREGATION ON DISTRIBUTED SYSTEMS

BACKGROUND

The present invention generally relates to cloud computing and service, and more specifically, to computer systems, computer-implemented methods, and computer program products that perform relevant data aggregation on distributed systems in a fast, lock-free manner.

Cloud computing has become a popular way to offer various Information Technology (IT) concepts as services. In one implementation, a user or client can request a service they desire and transact with a remote "cloud" provider for the needed service. Cloud services include providing access to remote resources, such as cloud storage, software, and remote hardware, so that tasks can be performed remotely on behalf of the client. Cloud services have become popular, in part, because they enable users to access resources without having to store or manage support for those resources locally. Thus, users can access more resources than they could if limited to a local machine. Cloud services span a range of applications and include, for example, cloud computing and remote storage.

Recent advances in cloud-based architectures have made it possible to build large-scale distributed applications. By utilizing a large number of cooperating service nodes in a decentralized manner, applications can potentially achieve high scalability, availability, reliability, and performance. Data aggregation is an essential building block of modern distributed systems, enabling the determination of important system wide properties in a decentralized manner.

SUMMARY

Embodiments of the present invention are directed to methods for performing data aggregation in a fast, lock-free manner. A non-limiting example method includes producing new data at a first producer node of a distributed system having two or more producer nodes, a consumer node, and a global view. The global view includes a hierarchical binary tree of cell addresses. Each producer node includes a local view of the global view. Responsive to producing the new data, the local view of the first producer node is updated with the new data and a local timestamp and, if the local timestamp is greater than a global timestamp, a pointer in a cell address of the global view is flipped to point to the new data.

Embodiments of the present invention are directed to distributed systems configured to perform data aggregation in a fast, lock-free manner. A non-limiting example distributed system includes a global view defined by a hierarchical binary tree of cell addresses and two or more producer nodes, each having a local view representation of the global view. The distributed system further includes one or more consumer nodes communicatively coupled to the global view. The global view includes a tree height of $\log_2 N$ and each local view includes a depth between 0 and $\log_2 N$, where N is the number of producer nodes. A producer node, upon producing new data, is configured to update its local view with the new data and a local timestamp and, if the local timestamp is greater than a global timestamp, to flip a pointer in a cell address of the global view to point to the new data in its local view.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 7 depicts a data flow for performing data aggregation in a fast, lock-free manner in accordance with one or more embodiments of the present invention;

FIG. 8 depicts a data flow for performing data aggregation in a fast, lock-free manner in accordance with one or more embodiments of the present invention;

DETAILED DESCRIPTION

Figure 1:
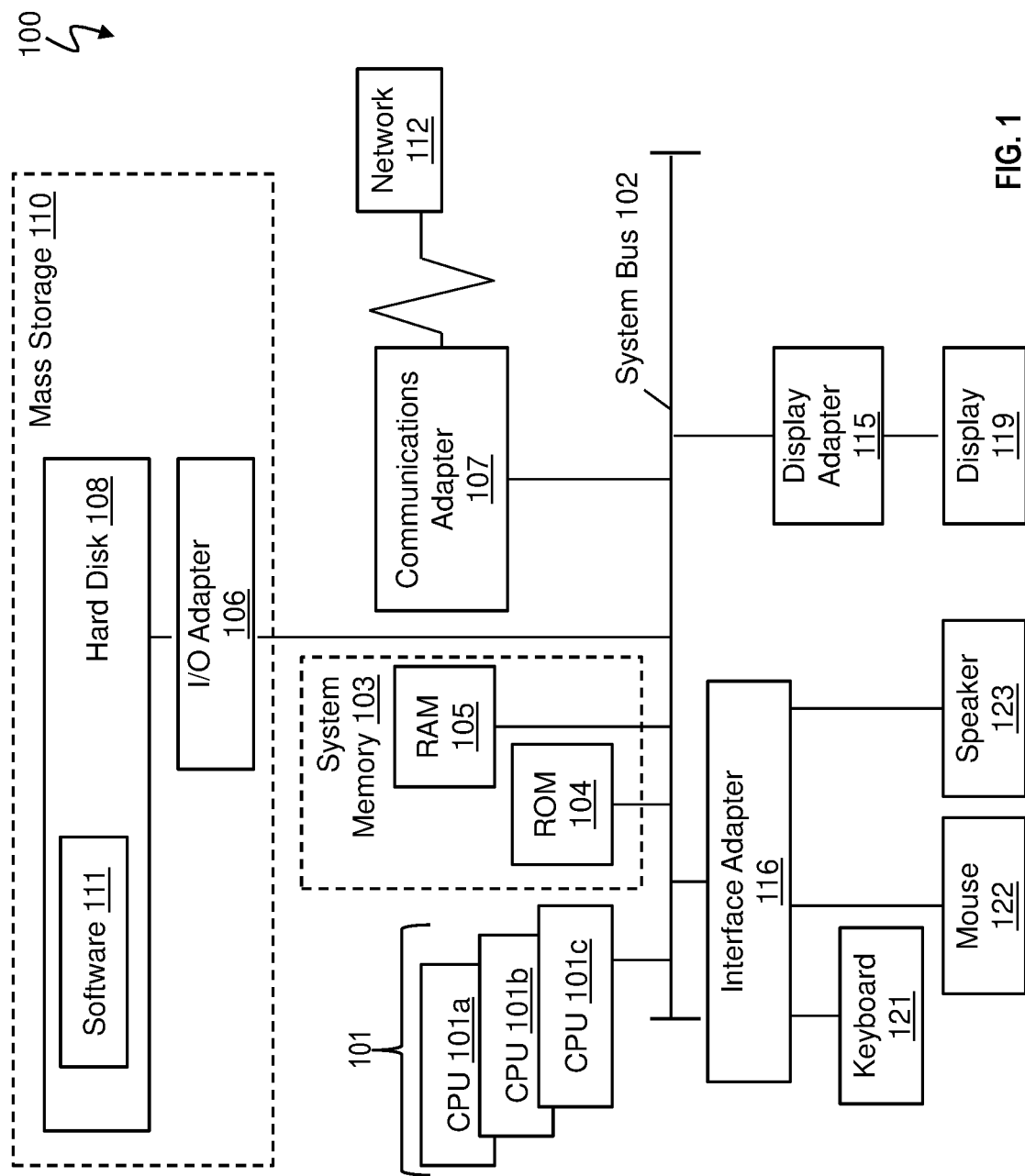
FIG. 1 depicts a block diagram of an example computer system for use in conjunction with one or more embodiments of the present invention.

Data aggregation forms a critical part of any distributed system, especially in cloud servicing, due to the remote, distributed nature of cloud resources. A distributed system includes a number of nodes (also referred to as computing units), each of which acts as a producer of data, a consumer of data, or both. Nodes can refer to individual CPUs in large server system or to servers in a distributed cluster. Typically, there will be N producers and M consumers, and N:M will be 1:1, although other arrangements are possible. The producers and consumers create and exchange data using a set of functions including writes (producer writes new data at regular interval defined by period $P_i$, where $i=[1,N]$) and reads (consumer reads the aggregated data of all producers at any point in time).

There are currently a large number of distinct data aggregation algorithms and architectures, all exhibiting different trade-offs in terms of accuracy, time, communication, fault-tolerance, and overhead. Each of these data aggregation implementations attempt to satisfy four tenets data aggregation: bounded staleness (aggregated data should not be older than a defined limit); monotonic reads (data should always be collected in a monotonically increasing order of time events); operational independence (each node or entity in a distributed system should work independent of the others); and low overhead read/write cost (collection and aggregation of data should be possible with minimal overhead in terms of the number of nodes in the distributed system).

An ideal data aggregation implementation would satisfy these four properties simultaneously. Unfortunately, current state-of-art data aggregation approaches, such as lock-based data aggregation and read, copy, update (RCU) based lock-free data aggregation, sacrifice one or more of these parameters to achieve the others. For example, lock-based data aggregation schemes, whereby all CPUs are locked prior to reading data, provides bounded staleness (bounded by the minimum period of all nodes) and monotonic reads, but cannot provide operation independence (taking locks obstructs other read/writes) and requires a high decision overhead. RCE-based approaches provide a degree of bounded staleness (bounded by the minimum period, although limited to ~1 ms as lowering the period further quickly raises decision overhead) and operational independence but give up monotonic reads (race conditions can cause earlier data to overwrite latest information, referred to as the lost updates problem) and a low decision overhead (overhead is proportional to the number of data producers). In short, state-of-art solutions either require locks or suffer from a degree of stale reads and/or lost updates.

A further challenge in designing distributed architectures is picking the right trade-off between accuracy and time complexity to make timely relevant decisions. In other words, consumers need to be very fast at priority (data access latency) with a minimal cost of loss in accuracy. Note that perfect accuracy is not actually required or optimal. System-wide data aggregation is of a transitory nature due the nature of data production and hence for decision making what is desirable is a representative system wide data aggregate which is fairly accurate as opposed to perfectly accurate. In other words, beyond certain accuracy thresholds the system participants cannot make a better decision and hence the loss in accuracy up to a certain extent is essentially cost-free, which can be translated to a faster data aggregation approach.

One or more embodiments of the present invention address one or more of the above-described shortcomings by providing computer-implemented methods, computing systems, and computer program products that perform relevant data aggregation on distributed systems in a fast, lock-free manner. Embodiments of the present invention leverage a combination of hierarchical data flow, lock-less memory access, and timestamps to satisfy each of the four tenets of data aggregation (bounded staleness, monotonic reads, operational independence, and low read/write overhead) simultaneously.

The data flow is organized in a hierarchical binary tree of cell addresses having height $\log_2 N$ for a system with N nodes. The hierarchical binary tree defines a "global view" of address values, each of which points to a local cell of a producer node. Each producer node holds a local copy of the binary tree representing a "local view" of the data produced by each node. A node, upon producing data, updates its local view with the newly produced data, tags the update with a unique "timestamp" (governed by a totally ordered domain), and ensures, if it is the newest data, that a respective cell address in the global viewpoint points to the data in its local copy. A node also updates its local view of other nodes by looking into the global view. This arrangement requires $O(\log_2 N)$ producer read-writes to update the whole local binary tree following production of new data. At each global update, the nodes compare the timestamp of generated data to find if its own data is no older than the copy already existing in the global view. Any consumer can collect the aggregated data by reading the top-level data in the global view. Notably, consumer read complexity will always be $O(1)$, as the top-level data is always fully aggregated. In some embodiments of the invention, nodes update their local view at random intervals to minimize the probability of concurrent conflicting updates.

Advantageously, a distributed system configured according to one or more embodiments offers several technical solutions over conventional data aggregation approaches. As an initial matter, the proposed combination of a hierarchical representation of information flow, lock-less access, and the tagging of timestamps minimizes the number of memory accesses while retaining the most relevant information without stale reads or lost updates. Overhead is minimal as memory access is logarithmic in proportion of number of nodes, i.e., $O(\log\text{-}n)$. Moreover, the proposed lock-free data aggregation approach can satisfy arbitrarily lower bounded staleness requirements due to low decision overhead at $O(\log\text{-}n)$ time complexity. This allows for lock-free data aggregation in a system with large number of computing units to guarantee bounded staleness. The aggregated data is always bounded by $2*G$ where G is the minimum period of all the producer nodes. Further advantages are realized due to the use of randomness: staggering the updates by individual computing units decreases the probability of conflicting updates.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node (e.g., a node 10 of FIG. 9 below). Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
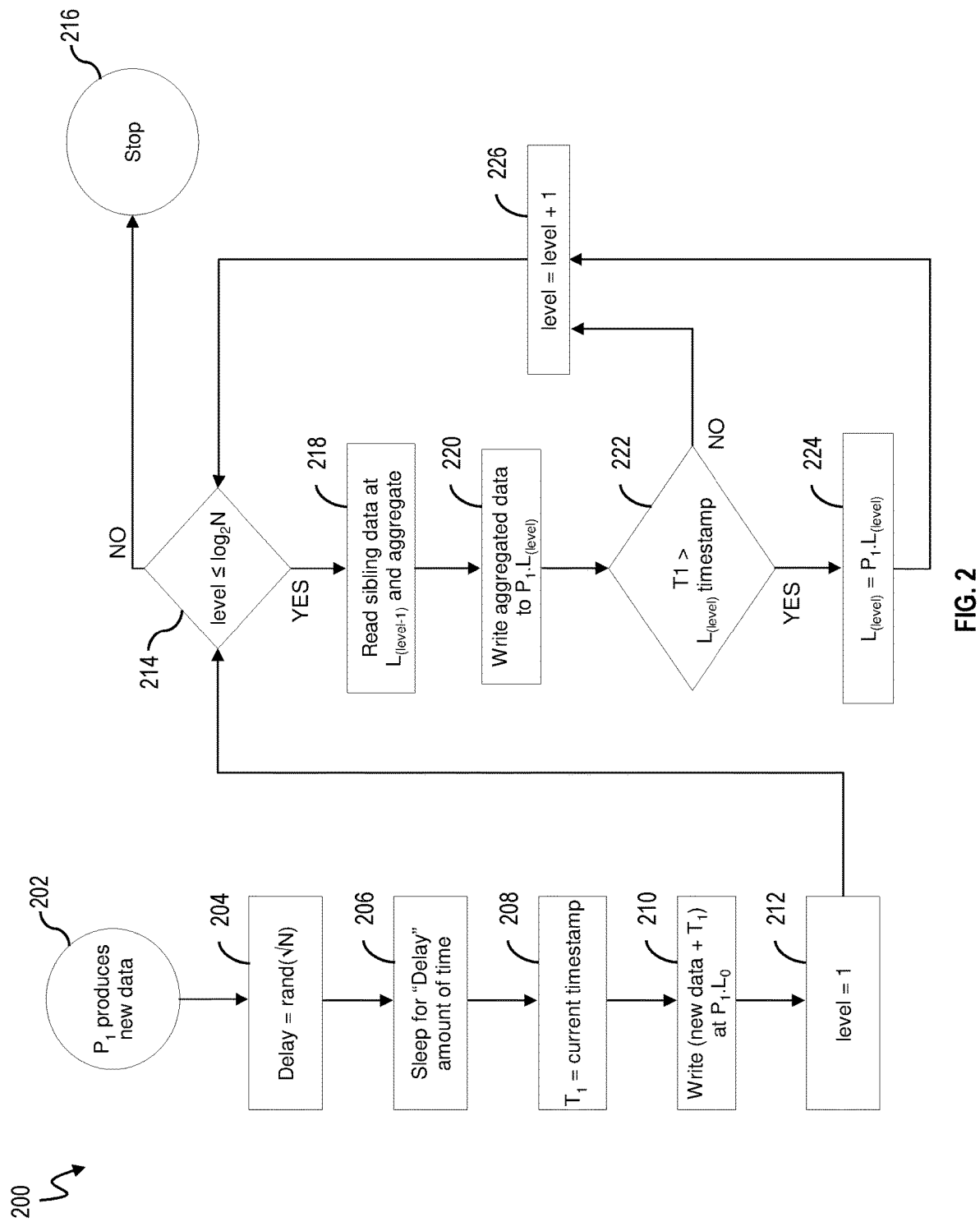
FIG. 2 depicts a data flow for performing data aggregation in a fast, lock-free manner in accordance with one or more embodiments of the present invention.

FIG. 2 depicts a data flow 200 for performing data aggregation in a fast, lock-free manner in accordance with one or more embodiments of the present invention. At step 202, a producer node $P_1$ generates new data $f(P_1)$. At step 204, a delay is calculated. In some embodiments of the invention, the delay is a random duration (e.g., seconds, milliseconds, etc.) between 0 and $\sqrt{N}$, although other delay intervals are possible. At step 206, the producer node $P_1$ sleeps for the delay time calculated during step 204. At step 208, the current timestamp (e.g., $T_1$) is determined. In some embodiments of the invention, the current timestamp is fetched from a totally ordered domain maintained by a module or device independent of the producer node $P_1$ (e.g., a global timekeeper device or module, not separately shown).

At step 210, the producer node $P_1$ begins data aggregation by writing the new data $f(P_1)$ to the first level of its local view (e.g., $P_1.L_0$), along with the current timestamp ($T_1$) at write time. At step 212, the "current level" (or simply, "level") is set to a value of 1. At step 214, the value of the current level is compared to $\log_2 N$. If the value of the current level (initially 1) is greater than $\log_2 N$, the data flow 200 proceeds to step 216 and the data aggregation scheme is complete. If the value of the current level is less than or equal to $\log_2 N$, the data flow 200 proceeds to step 218 and the data aggregation scheme continues.

At step 218, the producer node $P_1$ reads all sibling node local data at the prior level (e.g., for level 1 read $L_0$ data) and aggregates (i.e., determines which data is newest). As used herein, "sibling nodes" refer to the complete list of other producer nodes at the current level of the respective hierarchical binary tree (global view). At step 220, producer node $P_1$ writes the aggregated data to $P_1.L_{(current\ level)}$ along with the timestamp $T_1$. For example, during the initial pass where level=1, producer node $P_1$ writes the aggregated data ($P_1.L_0$, $P_2.L_0$ & $T_1$) to $P_1.L_1$.

At step 222, the value of the current timestamp ($T_1$) is compared to the value of the timestamp at the current level ($L_1$) of the global view. If the value of the current timestamp $T_1$ is newer (i.e., greater) than the value of the timestamp at $L_i$, then the process continues to step 224. If the value of the current timestamp $T_1$ is older (i.e., less) than the value of the timestamp at $L_i$, then the process skips to step 226. This ensures that global updates only occur when the producer node $P_1$ has the latest data.

At step 224, the current level ($L_1$) of the global view is updated to point to the respective level of the producer node $P_1$. For example, when the current level is 4, $L_4$ is updated to point to $P_1.L_4$.

The process then continues to step 226, where the value of the current level is incremented (i.e., level=level+1). Once incremented, the process then returns to step 214 and the cycle between steps 214 and 226 repeats (albeit for the next level). This continues until the condition at step 214 fails, ending the data aggregation scheme.

Figure 3:
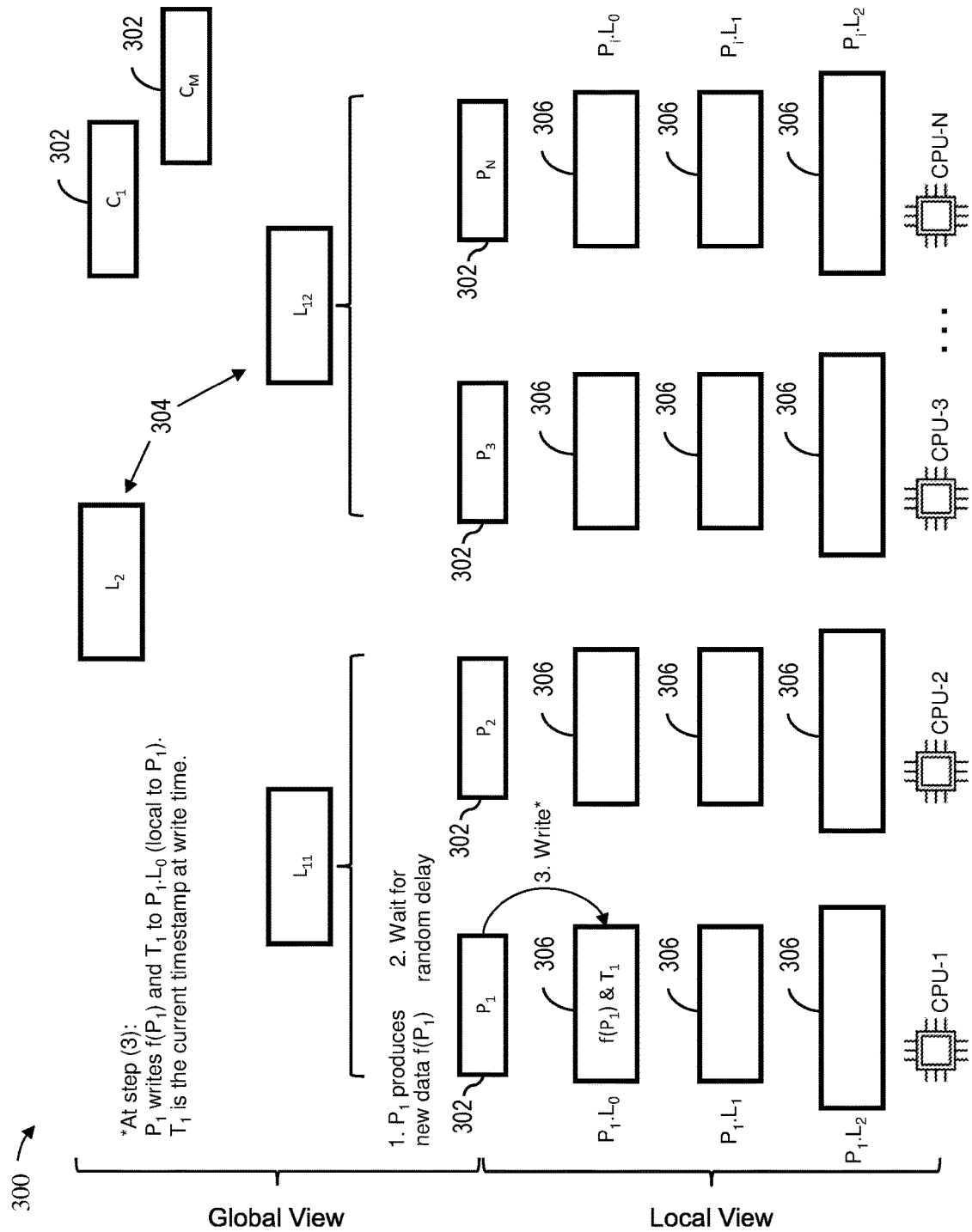
FIG. 3 depicts a block diagram of a distributed system configured for performing data aggregation in a fast, lock-free manner and an exemplary scenario for data aggregation in accordance with one or more embodiments of the present invention.

FIG. 3 is a block diagram of a distributed system 300 configured for performing data aggregation in a fast, lock-free manner in accordance with one or more embodiments of the present invention. The distributed system 300 includes one or more nodes 302 that serve as producers, consumers, or both. As shown in FIG. 3, nodes $P_1$, $P_2$, $P_3$, and $P_N$ are producer nodes, while nodes C1 and CM are consumer nodes. Here, "N" refers to the total number of producer nodes and "M" refers to the total number of consumer nodes. N and M can be arbitrarily large (e.g., from 1 to 10, 100, 1000, millions, etc.). For ease of discussion, assume N is 4 and M is 2. Other configurations are possible. In some embodiments of the invention, each of the nodes 302 defines a single processor in a large server system. In some embodiments of the invention, each of the nodes 302 defines a server in a distributed cluster. Elements of the computer system 100 of FIG. 1 may be used in and/or integrated into each of the nodes 302. For example, each of the nodes 302 can be communicatively coupled via a wired and/or wireless network (e.g., network 112) using a communications adapter (e.g., communications adapter 107).

The distributed system 300 organizes the data flow 200 between the nodes 302 using a hierarchical binary tree of global cell addresses 304 referred to as a "global view." The global view will have a height of $\log_2 N$, where N is the number of producer nodes. As shown, the cell addresses 304 include $L_2$, $L_{11}$, and $L_{12}$ and the height of the global view is 2 (as $\log_2(4)=2$).

Each of the producer nodes $P_1$ ... $P_N$ maintains a "local view" (a local copy) representing the global view. The local view is denoted $P_i.L$, where i is between 0 and N and L is the depth (level) of the respective local cell address 306. For example, $P_1.L_1$ represents the local view of the $P_1$ node at depth 1. The depth of each local view will fall in the range [0, $\log_2 N$]. Continuing from the prior example, where N is 4, the depth of each local view ranges from 0 to 2 (i.e., 0, 1, 2 for three total levels).

FIG. 3 further depicts an exemplary scenario for data aggregation (e.g., the data flow 200). As discussed previously, a producer node, upon producing data, updates its local view with the newly produced data and attaches a unique timestamp (which comes from a totally ordered domain) to the update. As shown, $P_1$ produces new data $f(P_1)$ at step 1.

In some embodiments of the invention, producer nodes update their local view at random intervals to minimize the probability of concurrent conflicting updates. In some embodiments of the invention, each producer node is subjected to a random period delay bounded by a predetermined threshold. In some embodiments of the invention, the predetermined threshold is $\sqrt{N}$, so that the probability of having any two producer nodes invoked at the same time is 1/N. Thus, even if two producer nodes are updating concurrently during a first time, there is only 1/N probability of having them collide (even following a second consecutive update). At step 2, $P_1$ waits for the random delay period to elapse before performing any data aggregation.

At step 3, $P_1$ begins data aggregation by writing the new data $f(P_1)$ to the first level of its local view (e.g., $P_1.L_0$), along with the current timestamp ($T_1$) at write time. $P_1$ then sets the current level to 1 and proceeds (steps 4 to 9) to update its local view of the other producer nodes by looking into the global view according to the data flow 200.

During this process, the producer node $P_1$ stores data $f(P_{sd(i)},$ current timestamp of $P_1$) in wherein sd(i) is a list of all producers in the respective level "i" of the local view (the "sibling nodes" discussed previously). Continuing with the prior example, sd(0) for $L_0$ contains only P1, sd(1) for L1 includes P1 and P2, and sd(2) for L2 includes P1, P2, P3, and P4. Notably, a producer node updates $L_i$ with the newest data if it has the latest timestamp. This takes $O(\log_2 N)$ reads to update the entire local binary tree (local view).

Figure 4:
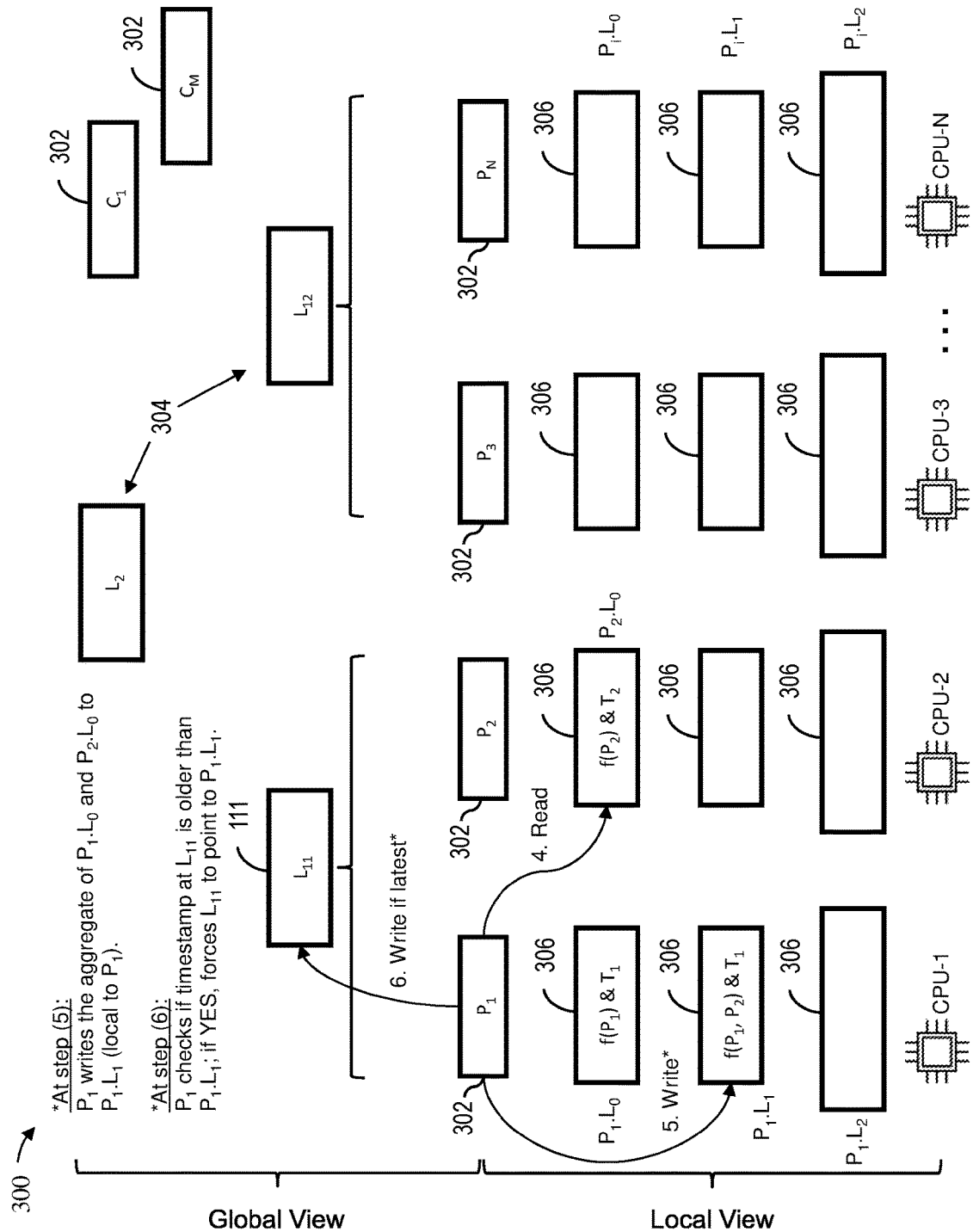
FIG. 4 depicts a continuation of the exemplary scenario described in FIG. 3 according to one or more embodiments.

FIG. 4 depicts a continuation of the exemplary scenario described in FIG. 3 according to one or more embodiments. At step 4, $P_1$ reads the $L_0$ local data from sibling node $P_2$ (e.g., $P_2.L_0$, or simply, $f(P_2)$). At step 5, $P_1$ writes the aggregated data $f(P_1, P_2)$ and the current timestamp $T_1$ to the local view $P_1.L_1$. The value of the aggregated data $f(P_1, P_2)$ will be equal to the value of the respective producer data (e.g., $f(P_1)$ or $(P_2)$) having the newest timestamp value.

At step 6, $P_1$ determines whether a global view update is needed at the current level (here, level 1). Specifically, $P_1$ will compare the timestamp at the global cell address 304 labeled "$L_{11}$" to the current timestamp $T_1$. $P_1$ forces a pointer at $L_{11}$ to $P_1.L_1$ only if its timestamp is latest. $P_1$ then increments the current level to 2 and continues to step 7.

Figure 5:
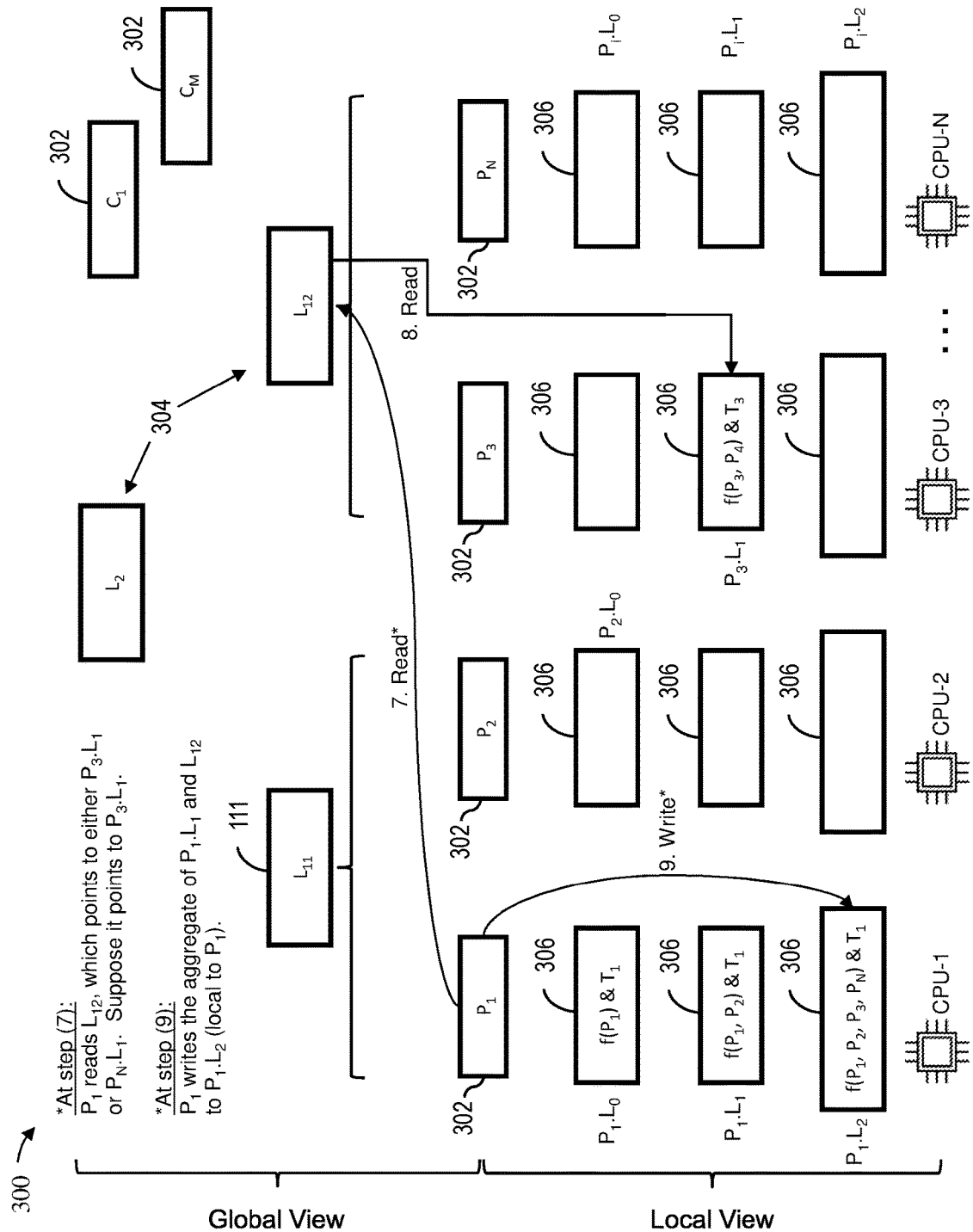
FIG. 5 depicts a continuation of the exemplary scenario described in FIG. 4 according to one or more embodiments.

FIG. 5 depicts a continuation of the exemplary scenario described in FIG. 4 according to one or more embodiments. At step 7, $P_1$ reads the pointer from $L_{12}$, which points to either $P_3.L_1$ or $P_N.L_1$. Suppose it points to $P_3.L_1$. At step 8, $P_1$ reads the data $f(P_3, P_4)$ at $P_3.L_1$. At step 9, $P_1$ writes the aggregated data $f(P_1, P_2, P_3, P_N)$ and the current timestamp $T_1$ to the local view $P_1.L_2$. The value of the aggregated data $f(P_1, P_2, P_3, P_N)$ will be equal to the value of the respective producer data (e.g., $f(P_1)$, $f(P_2)$, $f(P_3)$, or $f(P_N)$) having the newest timestamp value.

Figure 6:
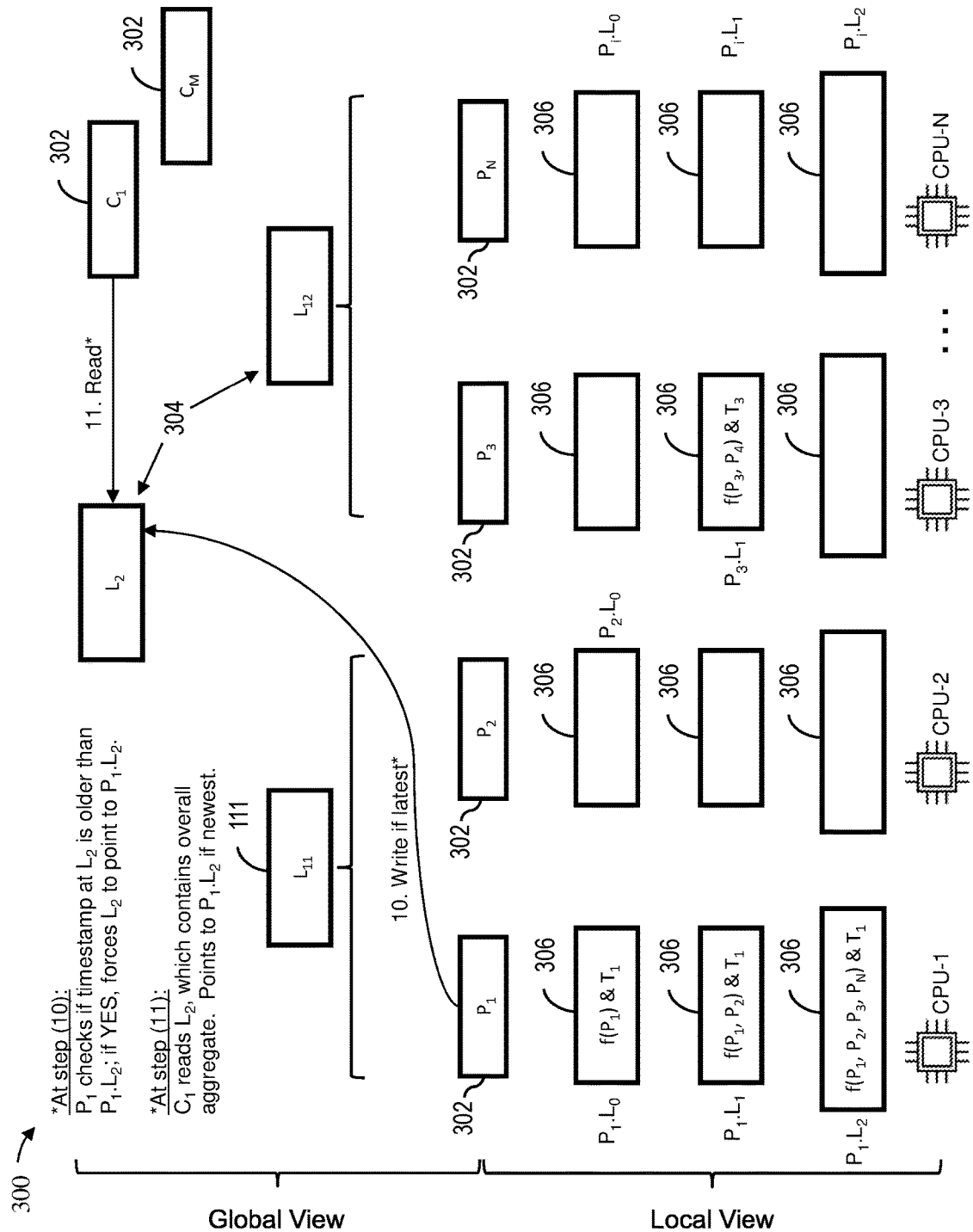
FIG. 6 depicts a continuation of the exemplary scenario described in FIG. 5 according to one or more embodiments.

FIG. 6 depicts a continuation of the exemplary scenario described in FIG. 5 according to one or more embodiments. At step 10, $P_1$ determines whether a global view update is needed at the current level (here, level 2). Specifically, $P_1$ will compare the timestamp at the global cell address 304 labeled "$L_2$" to the current timestamp $T_1$. $P_1$ forces a pointer at $L_2$ to Paz only if its timestamp is latest. $P_1$ then increments the current level to 3 and the data aggregation process ends (recall that the scheme ends when the current level is greater than $\log_2 N$).

At step 11, consumer $C_1$ can now directly read $L_2$, which points to $P_1$. $L_2$ (if newer) for aggregated data in a single, lock-free operation.

FIG. 7 depicts a data flow 700 for performing data aggregation in a fast, lock-free manner in accordance with one or more embodiments of the present invention. As shown in FIG. 7, leveraging timestamps as previously discussed solves the lost update problem. To illustrate, consider two producer nodes $P_1$ and $P_2$ and further consider that $P_1$ is relatively slower than $P_2$ (perhaps $P_1$ operates at a lower frequency, although other reasons are possible).

As further shown in FIG. 7, $P_1$ produces data $f(P_1)$ at $T_1$, while $P_2$ produces data $f(P_2)$ at $T_2$. Observe that $P_2$'s data is "newer". Each of $P_1$ and $P_2$ waits for their respective random delays, and then proceeds to update their local views according to one or more embodiments. Due to sequencing (e.g., differences in the random delay time), $P_1$ reads $P_2.L_0$ and writes to $P_1.L_1$ before $P_2$ has a chance to write $P_2.L_0$ with the new data f($P_2$) at timestamp $T_5$. Hence, $P_1$ believes (incorrectly) that it has the newest data f($P_1$), which is now stored at $P_1.L_1$ at $T_3$.

$P_2$ eventually catches up (after the randomly determined longer delay), writes $P_2.L_0$ with f($P_2$) at $T_5$, and writes the aggregate of f($P_1, P_2$) to $P_2.L_1$ at $T_7$. Note that $P_2$ correctly sees that the f($P_2$) data is newer. $P_2$, being relatively faster than $P_1$, immediately attempts to update the shared global view element "$L_{11}$". At $T_8$, $P_2$ succeeds (with timestamp $T_5$) in updating $L_{11}$ to point to $P_2.L_1$.

Later, the relatively slower $P_1$ attempts to write $L_{11}$ (believing, incorrectly, to have the latest data) at $T_{11}$. Using conventional data aggregation systems, $P_1$ would now overwrite the newer $P_2$ data (as $P_1$, a slower device, presents as "newer" data). This is known as the lost updates problem in data aggregation and can result in violating the monotonic reads tenant. Advantageously, however, $P_1$ fails to update $L_{11}$, as the current timestamp for $P_1$ ($T_3$) is older than that already found at $L_{11}$ ($T_5$). Thus, the lost updates problem is avoided.

FIG. 8 depicts a data flow 800 for performing data aggregation in a fast, lock-free manner in accordance with one or more embodiments of the present invention. As shown in FIG. 8, leveraging a random delay prior to writes as previously discussed mitigates the concurrent updates problem. To illustrate, consider two producer nodes $P_1$ and $P_2$ having same relative speeds.

As further shown in FIG. 8, $P_1$ produces data f($P_1$) at $T_1$ and $P_2$ concurrently produces data f($P_2$) at $T_1$. Each of $P_1$ and $P_2$ waits for their respective random delays, and then proceeds to update their local views according to one or more embodiments. Due to sequencing (e.g., differences in the random delay time), $P_1$ writes to $P_1.L_0$ with timestamp $T_5$ while $P_2$ writes to $P_2.L_0$ with timestamp $T_6$. As shown, $P_1$ waits for a 3-tick delay, while $P_2$ waits for a 4-tick delay.

Using conventional data aggregation systems without random delay, $P_1$ and $P_2$ would attempt to overwrite $L_{11}$ at the same time. This is known as the concurrent updates problem in data aggregation and can lead to stalls. Advantageously, however, $P_1$ is able to update $L_{11}$ at $T_8$, while $P_2$ is delayed until $T_9$. Observe that $P_2$ remains able to update $L_{11}$ at $T_9$, as the current timestamp from $P_1$ ($T_5$) at $L_{11}$ is older than that presented by $P_2$ ($T_6$).

Figure 9:
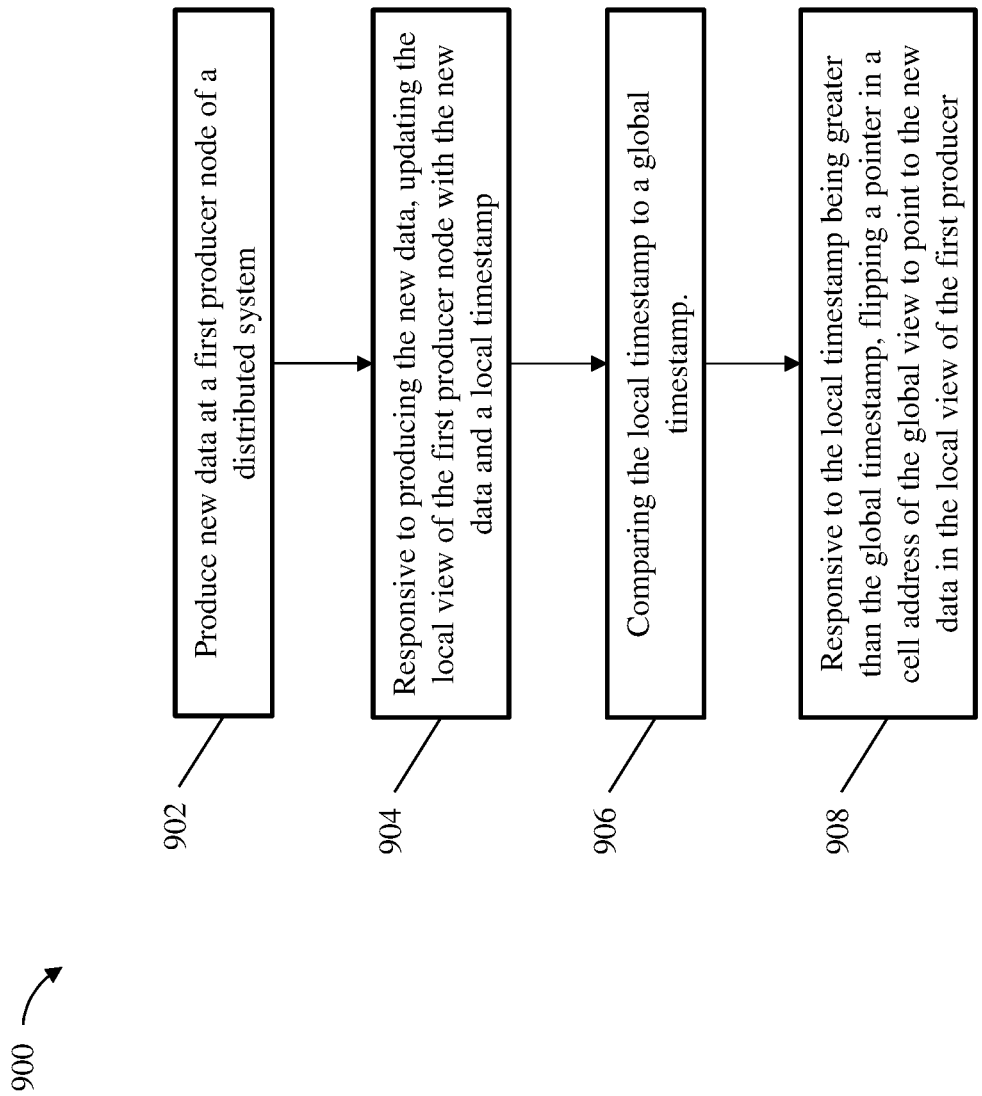
FIG. 9 is a flowchart in accordance with one or more embodiments of the present invention.

Referring now to FIG. 9, a flowchart 900 for performing data aggregation in a fast, lock-free manner is generally shown according to an embodiment. The flowchart 900 is described in reference to FIGS. 1-8 and may include additional blocks not depicted in FIG. 9. Although depicted in a particular order, the blocks depicted in FIG. 9 can be rearranged, subdivided, and/or combined.

At block 902, new data is produced at a first producer node of a distributed system. The distributed system can include two or more producer nodes, a consumer node, and a global view for managing data aggregation. The global view includes a hierarchical binary tree of cell addresses and each of the two or more producer nodes includes a local view representation (local copy) of the global view. The global view further includes a tree height of $\log_2 N$ and each local view includes a depth between 0 and $\log_2 N$, where N is the number of producer nodes.

At block 904, responsive to producing the new data, the local view of the first producer node is updated with the new data and a local timestamp. Moreover, if the local timestamp is greater than a global timestamp, a pointer in a cell address of the global view is flipped to point to the new data in the local view of the first producer. In some embodiments of the invention, the local timestamp is assigned by a totally ordered domain.

In some embodiments of the invention, producer nodes update their local view at random intervals to minimize a probability of concurrent conflicting updates. In some embodiments of the invention, each producer node is assigned a random period delay bounded by $\sqrt{N}$ so that the probability of concurrent conflicting updates is 1/N.

In some embodiments of the invention, the consumer node is configured to read a cell address of the global view. In some embodiments of the invention, read complexity for the consumer node is O(1).

In some embodiments of the invention, the first producer node, upon producing new data, is further configured to read the local view of one or more other producer nodes and to aggregate the read data with the new data. In some embodiments of the invention, the first producer node compares the local timestamp to a sibling timestamp of the one or more other producer nodes. In some embodiments of the invention, aggregating the read data with the new data includes writing one of the read data or the new data to a cell address of the local view based on the comparison of the local timestamp to the sibling timestamp. In some embodiments of the invention, producer node read-write complexity is $O(\log_2 N)$. In some embodiments of the invention, aggregating the read data with the new data includes lock-free data aggregation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
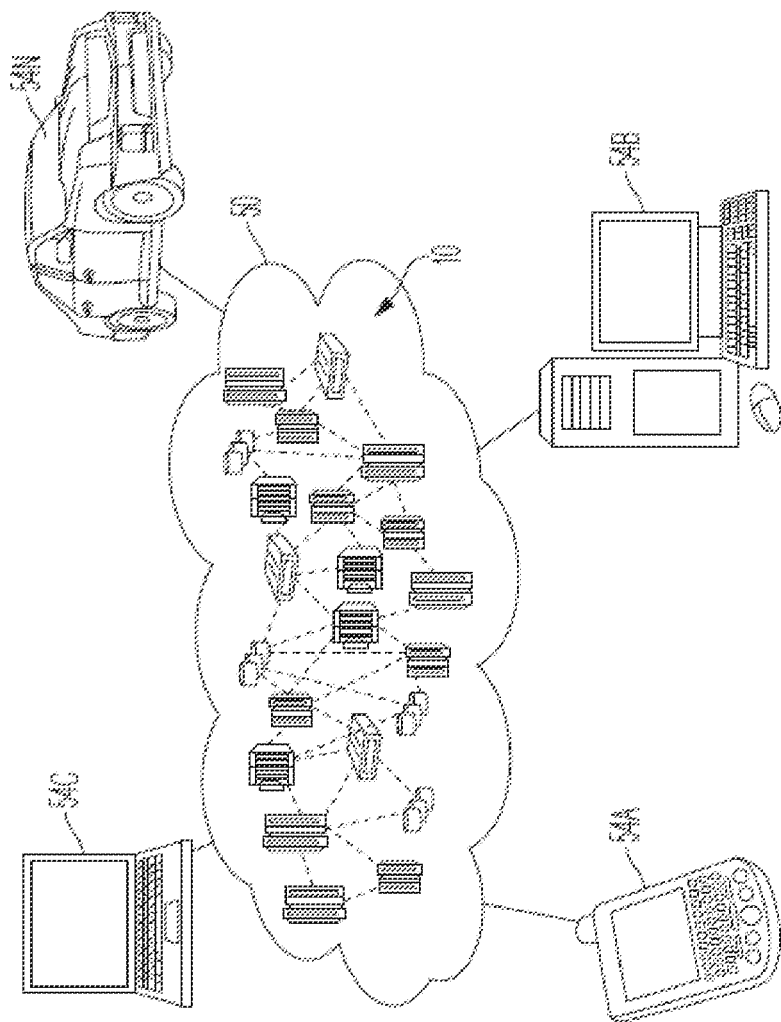
FIG. 10 depicts a cloud computing environment according to one or more embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
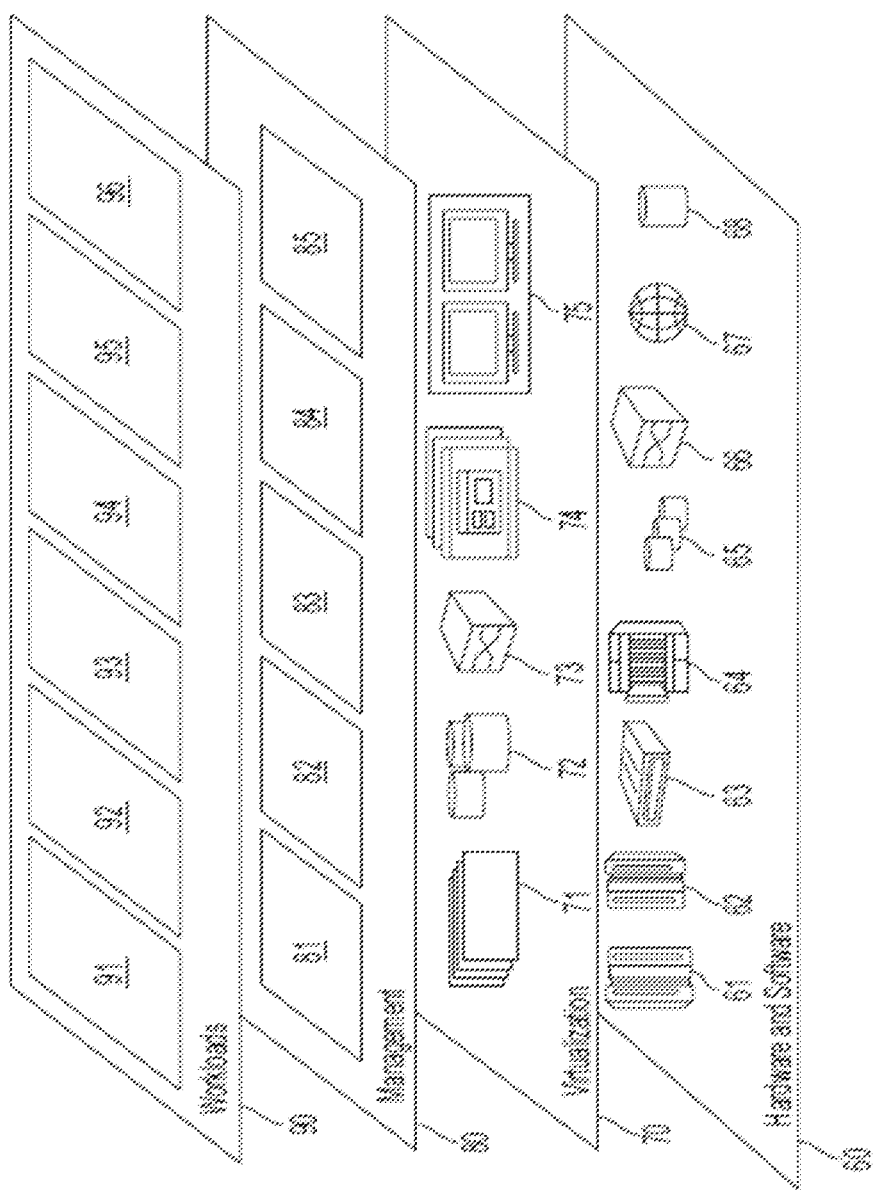
FIG. 11 depicts abstraction model layers according to one or more embodiments of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 61; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 71, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; data analytics processing 94; transaction processing 95; and software applications 96, etc. Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

For example, any or all of the blocks depicted with respect to FIGS. 7, 8, and 9, can be implemented as part of a computer-implemented method, a system, or as a computer program product. The system can include a memory having computer readable instructions and one or more processors for executing the computer readable instructions, the computer readable instructions controlling the one or more processors to perform operations including those depicted with respect to FIGS. 7, 8, and 9. The computer program product can include a computer readable storage medium having program instructions embodied therewith, the program instructions executable by one or more processors to cause the one or more processors to perform operations including those depicted with respect to FIGS. 7, 8, and 9.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for lock-free data aggregation, the method comprising:
   concurrently producing new data at a plurality of producer nodes of a distributed system comprising two or more producer nodes, a consumer node, and a global view comprising a hierarchical binary tree of cell addresses, wherein each of the two or more producer nodes comprises a local view representation of the global view, and wherein the global view further comprises a height of $\log_2 N$ and each local view comprises a depth between 0 and $\log_2 N$, where N is the number of producer nodes;

responsive to producing the new data, updating the local views of the two or more producer nodes with their respective new data and a local timestamp and, if the local timestamp is greater than a global timestamp, flipping a pointer in a cell address of the global view to point to the new data in the local view of the respective producer.

2. The method of claim 1, wherein the local timestamp is assigned by a totally ordered domain.

3. The method of claim 1, wherein producer nodes update their local view at random intervals to minimize a probability of concurrent conflicting updates.

4. The method of claim 3, wherein each producer node is assigned a random period delay bounded by $\sqrt{N}$ so that the probability of concurrent conflicting updates is $1/N$.

5. The method of claim 1, further comprising reading, by the consumer node, a cell address of the global view, wherein read complexity for the consumer node is $O(1)$.

6. The method of claim 1, wherein the first producer node, upon producing new data, is further configured to read the local view of one or more other producer nodes and to aggregate the read data with the new data.

7. The method of claim 6, wherein the first producer node compares the local timestamp to a sibling timestamp of the one or more other producer nodes.

8. The method of claim 7, wherein aggregating the read data with the new data comprises writing one of the read data or the new data to a cell address of the local view based on the comparison of the local timestamp to the sibling timestamp.

9. The method of claim 8, wherein producer node read-write complexity is $O(\log_2 N)$.

10. The method of claim 6, wherein aggregating the read data with the new data comprises lock-free data aggregation that satisfies at least bounded staleness, monotonic reads, operational independence, and low read/write overhead simultaneously.

11. A distributed system comprising:
a global view comprising a hierarchical binary tree of cell addresses;
two or more producer nodes, each comprising a local view representation of the global view; and
one or more consumer nodes communicatively coupled to the global view;
wherein the global view further comprises a height of $\log_2 N$ and each local view comprises a depth between 0 and $\log_2 N$, where N is the number of producer nodes; and
wherein a producer node, upon producing new data, is configured to update its local view with the new data and a local timestamp and, if the local timestamp is greater than a global timestamp, to flip a pointer in a cell address of the global view to point to the new data in its local view.

12. The system of claim 11, wherein the local timestamp is assigned by a totally ordered domain.

13. The system of claim 11, wherein producer nodes update their local view at random intervals to minimize a probability of concurrent conflicting updates.

14. The system of claim 13, wherein each producer node is assigned a random period delay bounded by $\sqrt{N}$ so that the probability of concurrent conflicting updates is $1/N$.

15. The system of claim 11, wherein read complexity for the one or more consumer nodes is $O(1)$.

16. The system of claim 11, wherein the producer node, upon producing new data, is further configured to read the local view of one or more other producer nodes and to aggregate the read data with the new data.

17. The system of claim 16, wherein the producer node compares the local timestamp to a sibling timestamp of the one or more other producer nodes.

18. The system of claim 17, wherein aggregating the read data with the new data comprises writing one of the read data or the new data to a cell address of the local view based on the comparison of the local timestamp to the sibling timestamp.

19. The system of claim 18, wherein producer node read-write complexity is $O(\log_2 N)$.

20. The system of claim 16, wherein aggregating the read data with the new data comprises lock-free data aggregation that satisfies at least bounded staleness, monotonic reads, operational independence, and low read/write overhead simultaneously.

* * * * *